United States Patent
Spielberg

(10) Patent No.: US 10,003,728 B2
(45) Date of Patent: Jun. 19, 2018

(54) TRANSMITTING SETTINGS IN A DIGITAL IMAGING SYSTEM

(71) Applicant: International Business Machines Corporation, Armonk, NY (US)

(72) Inventor: Anthony C. Spielberg, Burlington, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/788,379

(22) Filed: Oct. 19, 2017

(65) Prior Publication Data

US 2018/0041677 A1  Feb. 8, 2018

Related U.S. Application Data

(63) Continuation of application No. 14/970,475, filed on Dec. 15, 2015.

(51) Int. Cl.
*H04N 5/232* (2006.01)
*H04N 5/247* (2006.01)

(52) U.S. Cl.
CPC ......... *H04N 5/232* (2013.01); *H04N 5/23206* (2013.01); *H04N 5/247* (2013.01)

(58) Field of Classification Search
CPC ..... H04N 5/232; H04N 5/247; H04N 5/23206
See application file for complete search history.

(56) References Cited

U.S. PATENT DOCUMENTS

| 9,521,398 | B1 | 12/2016 | Woodman et al. |
|---|---|---|---|
| 2011/0205380 | A1 | 8/2011 | Shirakawa |
| 2012/0249806 | A1 | 10/2012 | Gong et al. |
| 2014/0002664 | A1 | 1/2014 | Hanabusa |
| 2014/0132741 | A1 | 5/2014 | Aagaard et al. |
| 2014/0184831 | A1 | 7/2014 | Watanabe et al. |
| 2017/0171442 | A1 | 6/2017 | Spielberg |
| 2017/0171452 | A1 | 6/2017 | Spielberg |

OTHER PUBLICATIONS

"Wired and Wireless File Transfer," Nikon USA, 2014, 2 pages.
"Image Download: Wireless Transmission," Infobank, Canon Professional Network, 2014, 7 pages.
Spielberg, "Transmitting Settings in a Digital Imaging System," U.S. Appl. No. 15/788,445, filed Oct. 19, 2017, 33 pages.
"List of IBM Patents or Patent Applications Treated as Related," Letter from Leslie A. Van Leeuwen, Oct. 19, 2017, 2 pages.

*Primary Examiner* — Twyler Haskins
*Assistant Examiner* — Angel L Garces-Rivera
(74) *Attorney, Agent, or Firm* — Van Leeuwen & Van Leeuwen; Tihon Poltavets

(57) ABSTRACT

An approach is provided to control digital imaging system. In the approach, isolated camera settings pertaining to a first camera body are configured. The first camera body is included in a camera group that includes two or more camera bodies. Each of the cameras in the camera group is controlled by a human operator. Shared camera settings that pertain to each of the cameras in the camera group are also configured. When an adjustment is received at the camera body from the human operator, the approach checks whether the adjustment is a shared group setting. If the adjustment is a shared setting, the system wirelessly transmits the adjustment over the wireless transmitter/receiver to the other camera bodies included in the camera group.

12 Claims, 6 Drawing Sheets

TRANSMITTING SETTINGS IN A DIGITAL IMAGING SYSTEM

BACKGROUND

Photographers often have two or more camera bodies in use simultaneously when photographing an event. This is done to have more capabilities, and faster access to different capabilities, than can be provided by a single camera/lens system. As shooting conditions change, the photographer can switch among multiple camera bodies to respond quickly to widely changing requirements. For example, a sports photographer may have a wide-angle lens mounted on one body, and a telephoto lens mounted on a second body. Having these two camera setups allows the photographer to capture action that occurs nearby using the camera body equipped with the wide-angle lens, and action that occurs a distance using the camera body equipped with the telephoto lens. This switch can be made without losing the time needed to change camera lenses.

In practice, a significant challenge to using more than one camera body simultaneously is keeping multiple cameras set to the desired operational settings. As shooting conditions change, photographers often change settings on the camera to respond to those changing conditions. For example, if lighting levels drop significantly, the photographer may increase ISO sensitivity. Changing settings on the camera in use at the moment will allow that camera to get the desired results—but such changes made to one camera body will not affect the other cameras the photographer is using to photograph the event. When the photographer switches to a second camera, the photographer will have to replicate the operational setting changes on the second camera. Replicating these changes on the second camera costs the photographer valuable time, which may cause the photographer to miss getting important photographs of the event. In addition, the act of replicating such operational settings introduces the opportunity for human error, which could result in the use of incorrect camera settings on the second camera, and thus poor quality, or even ruined, photographs taken on the second camera.

BRIEF SUMMARY

An approach is provided to control digital imaging system. In the approach, isolated camera settings pertaining to a first camera body are configured. The first camera body is included in a camera group that includes two or more camera bodies. Each of the cameras in the camera group is controlled by a human operator. Shared camera settings that pertain to each of the cameras in the camera group are also configured. When an adjustment is received at the camera body from the human operator, the approach checks whether the adjustment is a shared group setting. If the adjustment is a shared setting, the system wirelessly transmits the adjustment over the wireless transmitter/receiver to the other camera bodies included in the camera group.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
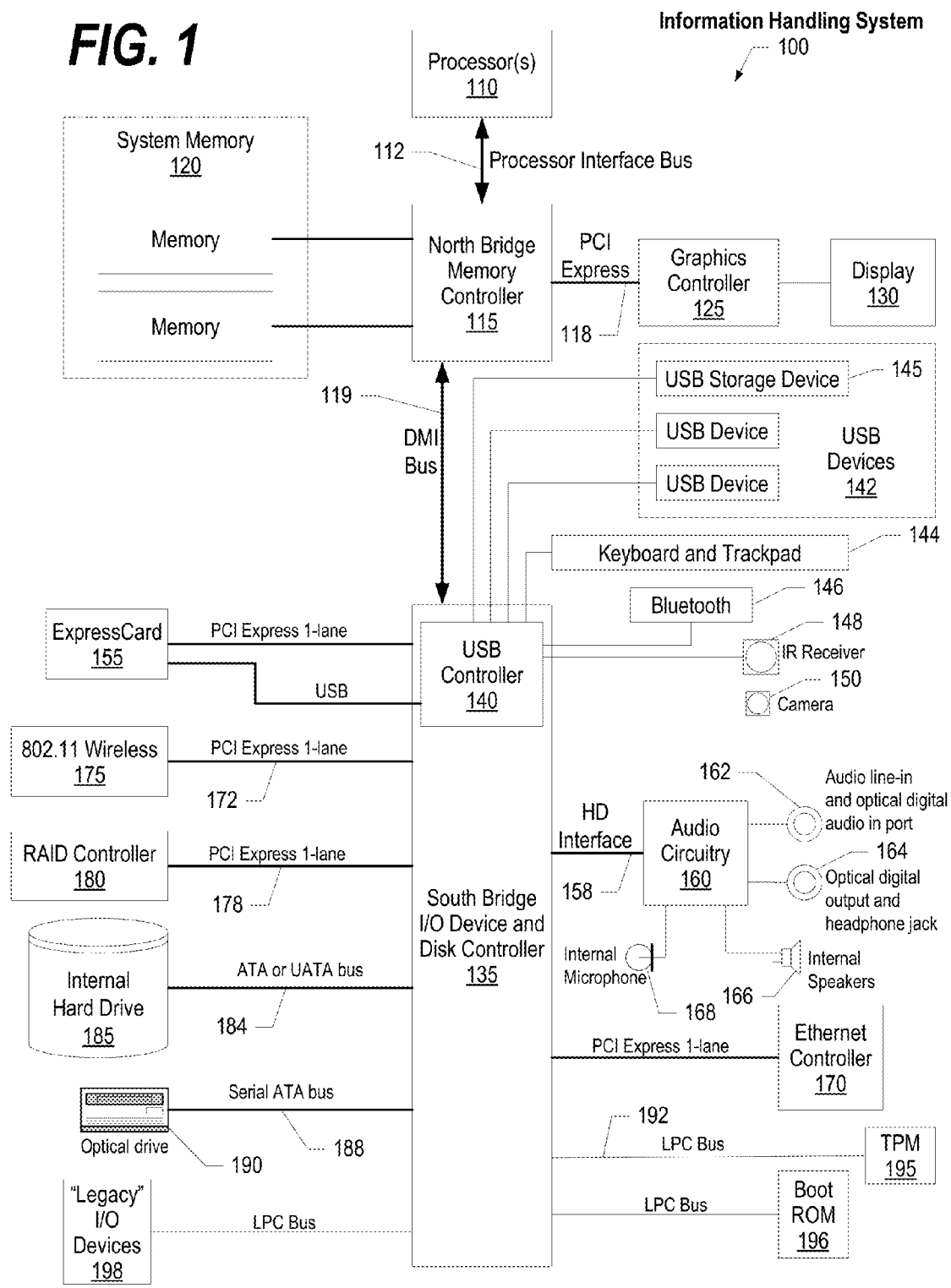
FIG. 1 depicts a schematic diagram of one illustrative embodiment of a question answering (QA) system in a computer network.

FIGS. 1-6 depict an approach that controls digital image systems. In the approach, multiple camera bodies are equipped with the necessary hardware and software to enable wireless communication over short distances (e.g., WiFi, Bluetooth, etc.). The camera bodies are also equipped with software and UIs which allow the photographer to set up camera groups that work together to share some camera settings. One possible group arrangement is a master/slave relationship with one camera body acting as the "master" and sends shared setting adjustments to the other camera bodies that act as "slaves" and make adjustments based on the shared settings. Shared camera settings are with respect to operational control settings of the cameras included in the camera group (e.g., ISO sensitivity, lens aperture, shutter speed, white balance, etc.). When a sharing relationship is activated, operational settings changes made by the photographer on any camera body can be broadcast to, and replicated in real time on, the other camera bodies. Thus, as the photographer responds to changing shooting conditions by making changes to camera settings, such changes will affect not only the camera in use at the moment, but the other cameras which may be called into use in the immediate future.

Embodiments of the present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
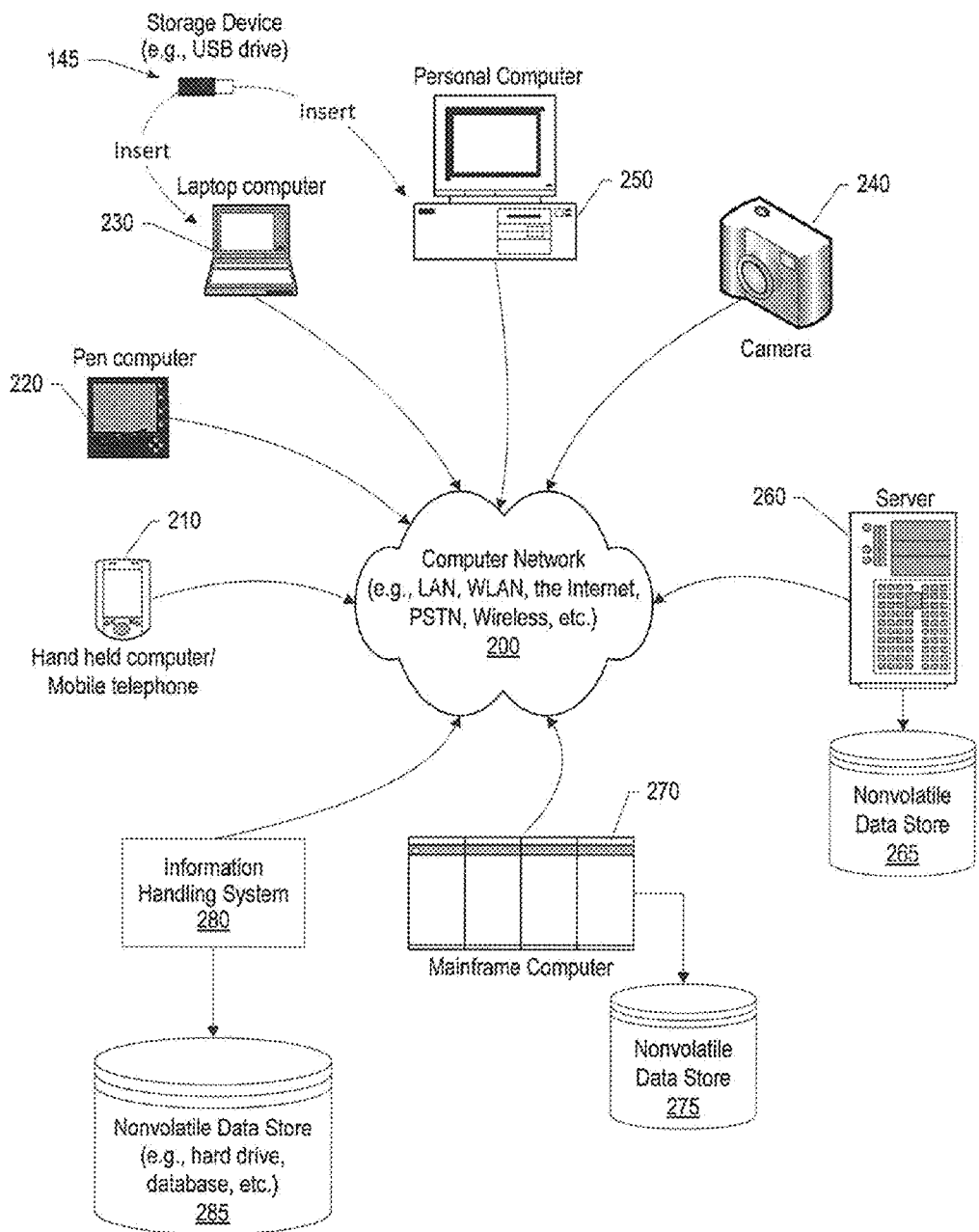
FIG. 2 illustrates an information handling system, more particularly, a processor and common components, which is a simplified example of a computer system capable of performing the computing operations described herein.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, camera body 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems.

Camera body 240 is shown as an example information handling system that is connected to computer network 200, usually be means of a wireless transmitter and receiver included in or near the body of the camera body. In addition to traditional information handling system components shown in FIG. 1, camera body 240 also includes a camera assembly that provides the camera body the ability to capture digital images. A power source, such as a battery pack or solar array, is included in camera body 240 to provide power to the camera body as well as to provide power to the information handling system components shown in FIG. 1.

Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
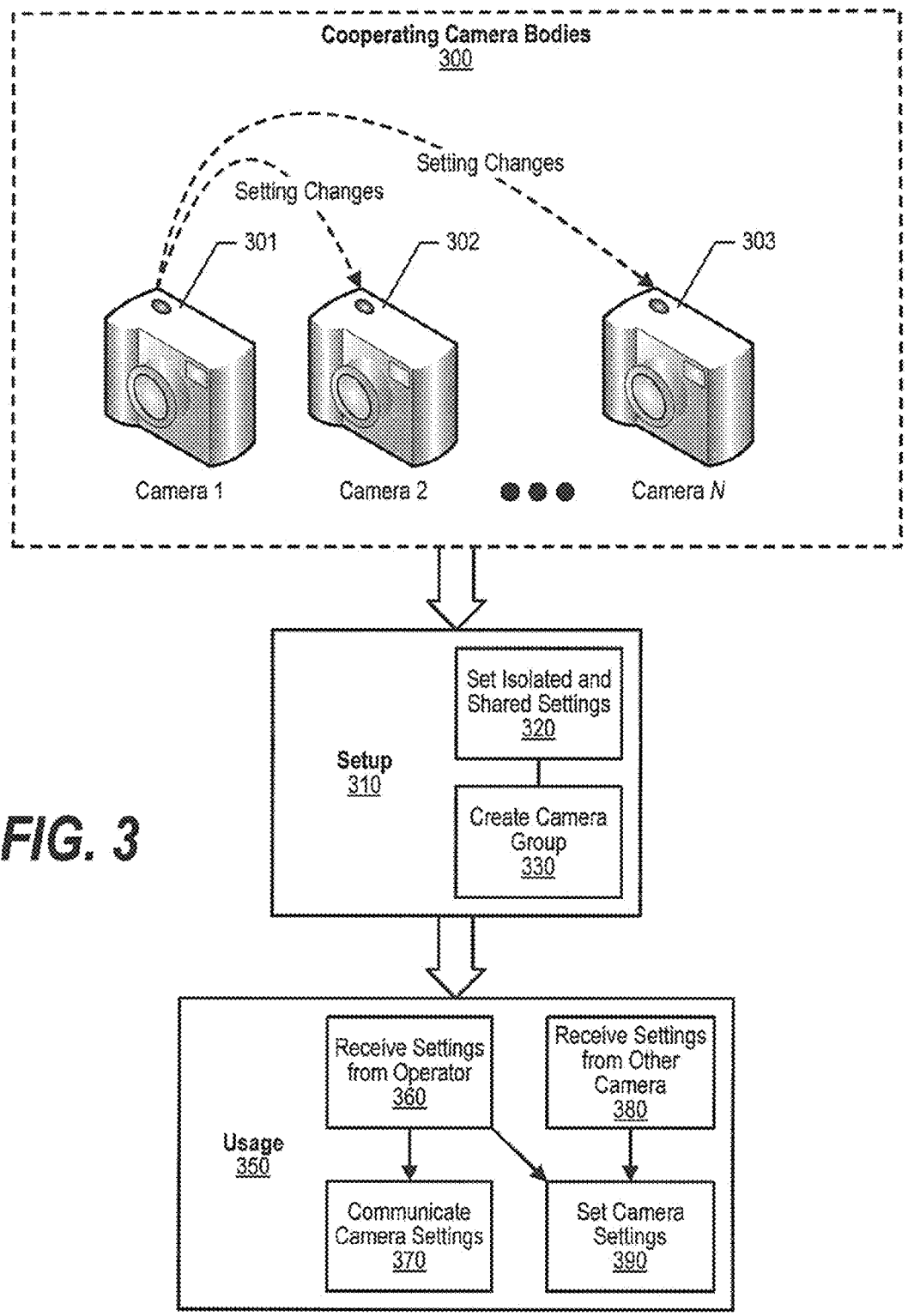
FIG. 3 is a component diagram depicting the components utilized in controlling digital image systems.

FIG. 3 is a component diagram depicting the components utilized in controlling digital image systems. At least three camera bodies are shown (camera 1 (301), camera 2 (302), through camera N (303). The cameras cooperate with one another by sharing some settings amongst the various cameras. Cooperating cameras 300 are in the same camera group. In one embodiment, the user sets up the camera group by following the steps shown in FIG. 5.

Setup process 310 includes setting, in step 320, the isolated and shared settings on each of the camera bodies included in camera group 300. In addition, setup processing includes the creation of camera group 300, such as by communicating with each of the camera bodies using a wireless transmitter/receiver that is integrated into each of the camera bodies and that allows each of the camera bodies to send and/or receive wireless data from other cameras included in the camera group. Wireless data can include adjustments made at one of the camera bodies and broadcast to the other camera bodies in the camera group.

Usage process 350 includes steps performed while the various camera bodies are in use, such as while the photographer that is using the camera bodies is photographing an event, such as a sporting event. Camera settings can be received at the camera body by the user interacting with controls on the camera or displayed on a touch-screen display device integrated with or included in the camera bodies of the various cameras. During usage, at step 360, camera settings, such as operational settings, are received from the operator of the camera bodies, such as the photographer that is photographing an event. Settings received from the operator are used, in step 390, to set or adjust components of the camera. In addition, if the settings that were received from the operator are shared camera settings, then, at step 370, these shared camera settings are communicated (e.g., transmitted to, etc.) the other camera bodies using the wireless transmitter/receivers included with each of the camera bodies. Other adjustments, as shown in step 380, may be received from other camera bodies that are in the same camera group. In one embodiment, each camera body determines whether to use adjustments shared by other camera bodies. This decision can be made based on whether the setting addressed by the shared adjustment data is an isolated setting on the camera. If the received setting is not an isolated setting, then, at step 390, the shared setting is used to adjust the components of the camera.

Figure 4:
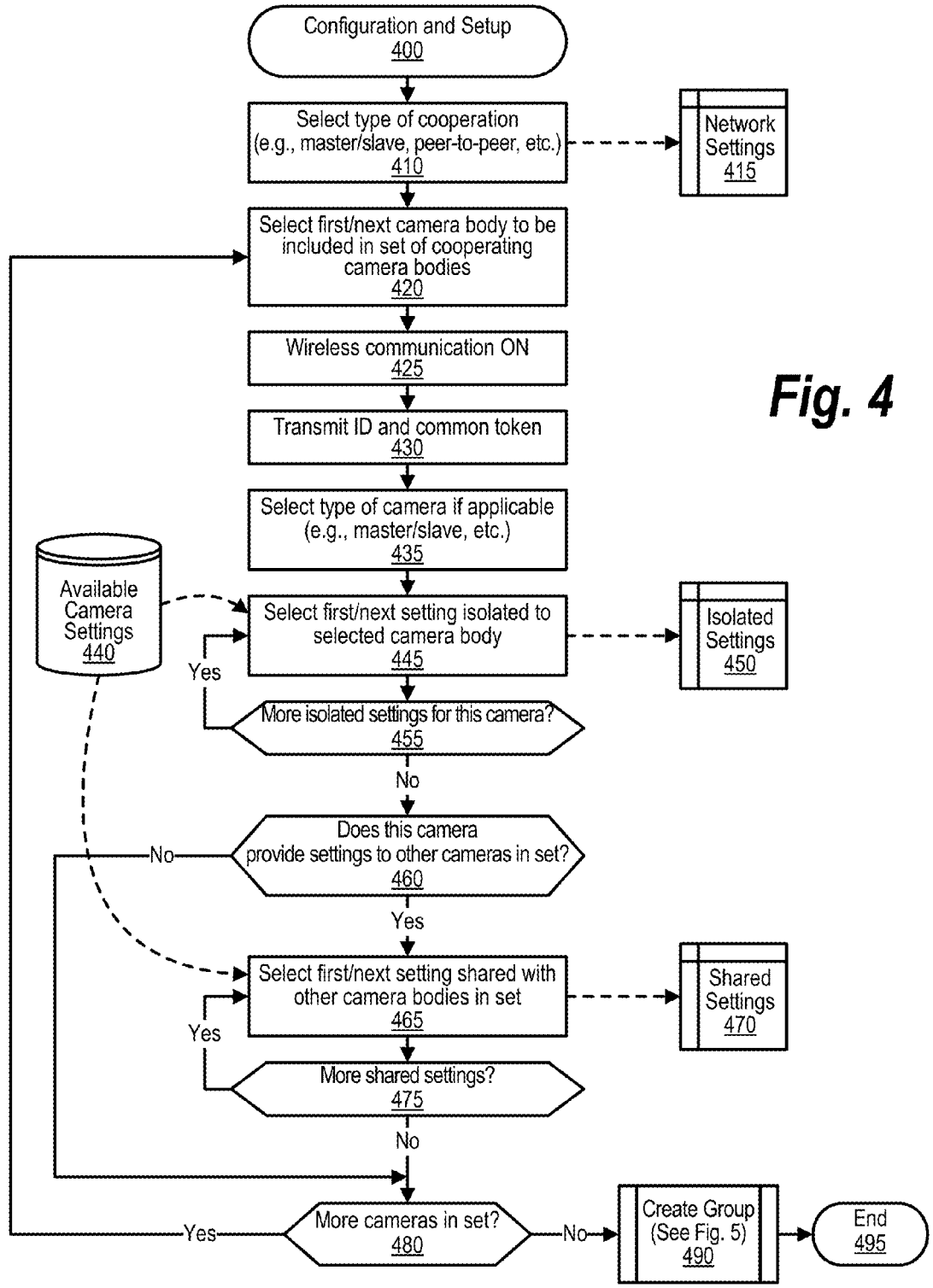
FIG. 4 is a flowchart that performs configuration and setup steps at each of the cameras included a camera group.

FIG. 4 is a flowchart that performs configuration and setup steps at each of the cameras included a camera group. FIG. 4 processing commences at 400 and shows a process that performs configuration and setup steps on camera bodies that are included in a camera group that shares settings. At step 410, the process selects the type of cooperation that is being established between the various camera bodies included in the camera group. For example, the camera group can be set up in a master/slave relationship with one of the camera bodies selected as being the "master" camera that sends shared adjustments that are utilized by the other cameras in the group referred to as "slave" cameras. A master/slave relationship might be advantageous in a situation where a photographer primarily uses or is more familiar or comfortable with the manual settings of one of the camera bodies (the "master") with the other camera bodies being set as "slaves" to the designated "master" camera. Another type of camera group that can be used is a peer-to-peer camera group with any of the cameras being able to share and send adjustments to the other cameras in the group. A peer-to-peer arrangement might be advantageous when a photographer uses any of the cameras in the camera group a roughly equal amount of time or is equally familiar with or comfortable with the manual settings provided by each of the camera bodies. In addition, in a peer-to-peer arrangement, the photographer does not need to be concerned with which particular camera is being used when a shared setting needs to be altered and can utilize any of the cameras in the camera group to alter the shared settings of all of the camera bodies included in the camera group. Step 410 stores the network settings in memory area 415 with memory area 415 being a memory area included in each of the camera bodies that is being included in the camera group.

At step 420, the process selects the first camera body to be included in the set of cooperating camera bodies. At step 425, the process turns a wireless transmitter/receiver ON, thus enabling wireless communications with the selected camera body. At step 430, the process repeatedly transmits, or broadcasts, the camera's identifier and a token that is provided to the camera body. The token being a common identifier to all of the camera bodies that are being included in the camera group. The camera's identifier and the common token are transmitted over the wireless transmitter of the camera so that any other camera bodies proximate to this camera body can receive the camera identifier and, if in the same camera group (having the same token), add the camera identifier to a list of camera identifiers that constitute the camera group.

At step 435, the user selects the type of camera, if applicable, that this camera performs in the camera group configuration. For example, if a master/slave configuration is being established, then one of the camera bodies is selected to be the "master" and the other camera bodies are selected to be the "slave" cameras.

At step 445, the process selects the first isolated camera setting to configure for the selected camera body. The available camera settings are retrieved from data store 440. The isolated camera settings are stored in memory area 450 that is included in the information handling system that is used to control the camera body. In some embodiments, such as in a peer-to-peer configuration, camera bodies can have different isolated settings. For example, one camera might have an isolated ISO sensitivity setting with other cameras having shared ISO sensitivity settings. The cameras with shared ISO sensitivity settings will adjust their respective ISO sensitivities when they receive a wireless instruction from another camera body informing them that the user has changed the ISO sensitivity setting on one of the camera bodies. The camera with an isolated ISO sensitivity setting, however, will not update its ISO sensitivity setting when it receives the wireless instruction from another camera body in the camera group informing it that the user has changed the ISO sensitivity setting. The process determines as to whether there are additional isolated settings to use for the selected camera body (decision 455). If there are additional isolated settings to use for the selected camera body, then decision 455 branches to the 'yes' branch which loops back to step 445 to select and store the next isolated setting for the selected camera body. This looping continues until no additional isolated settings are desired for the selected camera body, at which point decision 455 branches to the 'no' branch exiting the loop.

The process next determines as to whether the selected camera body provides shared settings to other cameras in the camera group (decision 460). If the selected camera body provides shared settings to other cameras in the camera group, then decision 460 branches to the 'yes' branch to select the shared settings using steps 465 and 475. On the other hand, if the selected camera body does not provide shared settings to other cameras in the camera group, then decision 460 branches to the 'no' branch bypassing steps 465 and 475. If the selected camera provides shared settings to other cameras then, at step 465, the process selects the first shared setting from data store 440 with the selected setting being a setting that is shared with other camera bodies in the camera group. The selected shared camera setting is stored in memory area 470 that is included in the information handling system that is used to control the camera body. Note that, similarly to the setup of the isolated settings, in some configurations, such as a peer-to-peer configuration, the user can choose which camera bodies share particular setting data with other camera bodies included in the camera group. Using the ISO settings example from before, one of the camera bodies can be set up to not share its ISO setting data with the other camera bodies in the group, while the other cameras in the group can be setup to share such ISO setting adjustments. The process next determines whether there are more shared settings that the selected camera body shares with other camera bodies in the camera group (decision 475). If there are more shared settings that the selected camera body shares with other camera bodies in the camera group, then decision 475 branches to the 'yes' branch which loops back to step 465 to select the next shared setting from data store 440. This looping continues until there are no more shared settings that the selected camera body shares with other camera bodies, at which point decision 475 branches to the 'no' branch exiting the loop.

The process next determines whether there are more cameras to be included in the camera group (decision 480). If there are more cameras to be included in the camera group, then decision 480 branches to the 'yes' branch which loops back to step 420 to select the next camera body from the set of camera bodies that the user wishes to include in the camera group. This looping continues until there are no more cameras to be included in the camera group, at which point decision 480 branches to the 'no' branch exiting the loop. At predefined process 490, the process performs the Create Group routine (see FIG. 5 and corresponding text for processing details). This routine establishes the camera group based on the camera identifiers and token data that is being broadcast by the various cameras intended to be in the group. Configuration and setup processing shown in FIG. 4 thereafter ends at 495.

Figure 5:
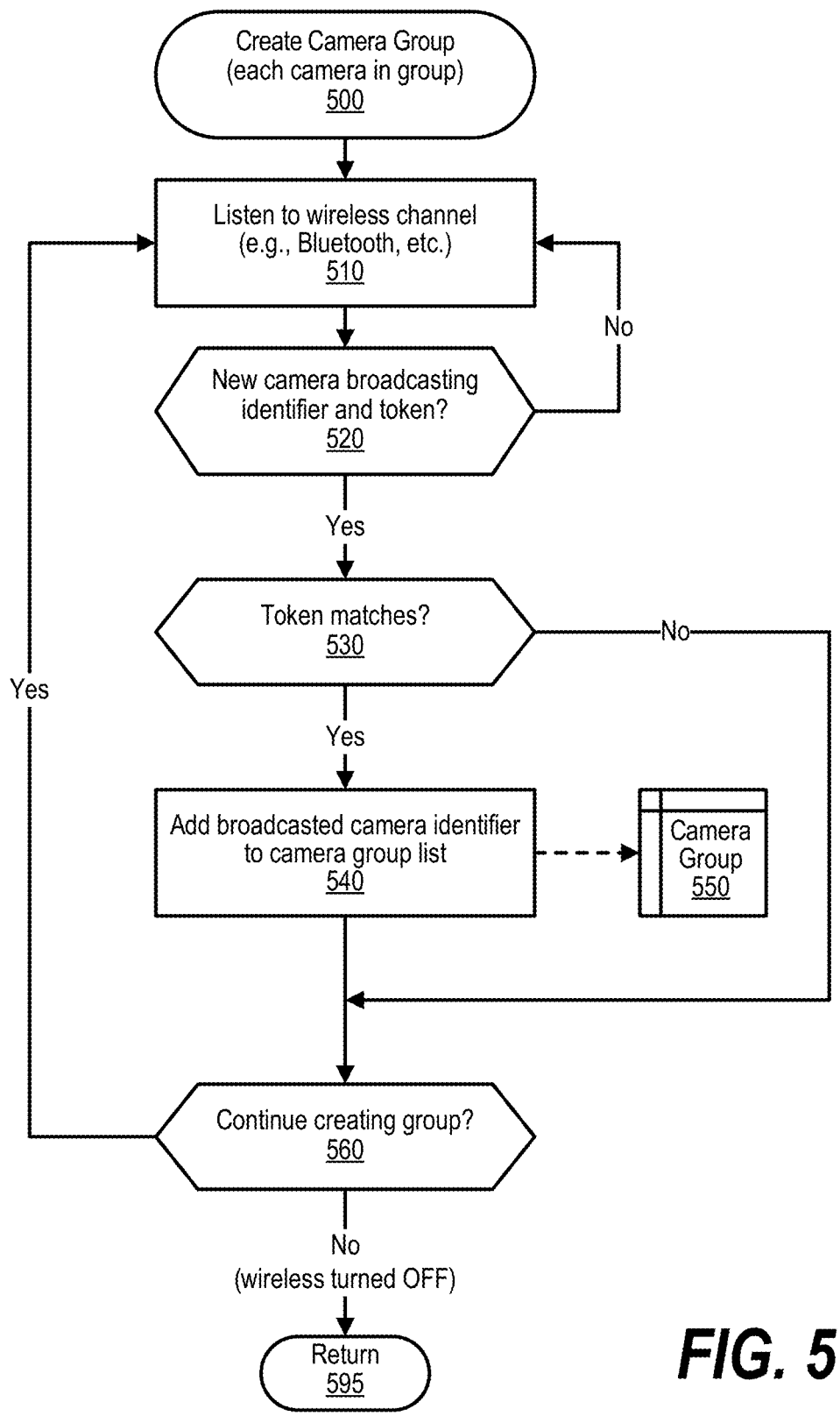
FIG. 5 is a flowchart that performs steps that create the camera group.

FIG. 5 is a flowchart that performs steps that create the camera group. FIG. 5 processing commences at 500 and shows the steps taken by a process that creates the camera group. Each camera body in the camera group performs this routine to add the other camera bodies to the camera group. This routine is called from FIG. 4 during setup of the individual camera bodies. During setup, the wireless transmitter/receiver of the individual camera bodies was turned on and each camera commenced broadcasting its identifier and a common token (e.g., group name, etc.) that is used by the camera group.

At step 510, the process performed by each camera body listens to the wireless channel (e.g., Bluetooth, etc.) for camera identifiers and tokens. At decision 520, the process determines as to whether an identifier and token was received from a new camera body that has not yet processed by this camera body. If a new camera identifier is being broadcasted, then decision 520 branches to the 'yes' branch to process the received camera identifier. On the other hand, if no new camera identifiers are received, then decision 520 branches to the 'no' branch which goes to the end of the routine.

When a new identifier is received, the process determines whether the new camera identifier is being broadcast with a token that matches a token that is expected by this camera body (decision 530). If the new camera identifier is being broadcast with a token that matches a token that is expected by this camera body, then decision 530 branches to the 'yes' branch to perform step 540. On the other hand, if the new camera identifier is being broadcast with a token that does not match the token that is expected by this camera body, then decision 530 branches to the 'no' branch which goes to the end of the routine. At step 540, the process performed by each camera body adds the received broadcasted camera identifier to the camera group list that is stored in memory area 550. Memory area 550 is a memory area accessible by the information handling system that controls operation of the components included in the camera body.

At the end of the routine, the process determines whether to continue creating the camera group (decision 560). If the decision is to continue creating the camera group, then decision 560 branches to the 'yes' branch which loops back to step 510 to continue listening for new camera identifiers to add to the camera group. This looping continues until the user decides to stop creating the camera group, at which point decision 560 branches to the 'no' branch exiting the loop. The decision to stop creating the camera group might be triggered when the user turns off the wireless functionality of the camera body or otherwise turns off the camera body. FIG. 5 processing thereafter returns to the calling routine (see FIG. 4) at 595.

Figure 6:
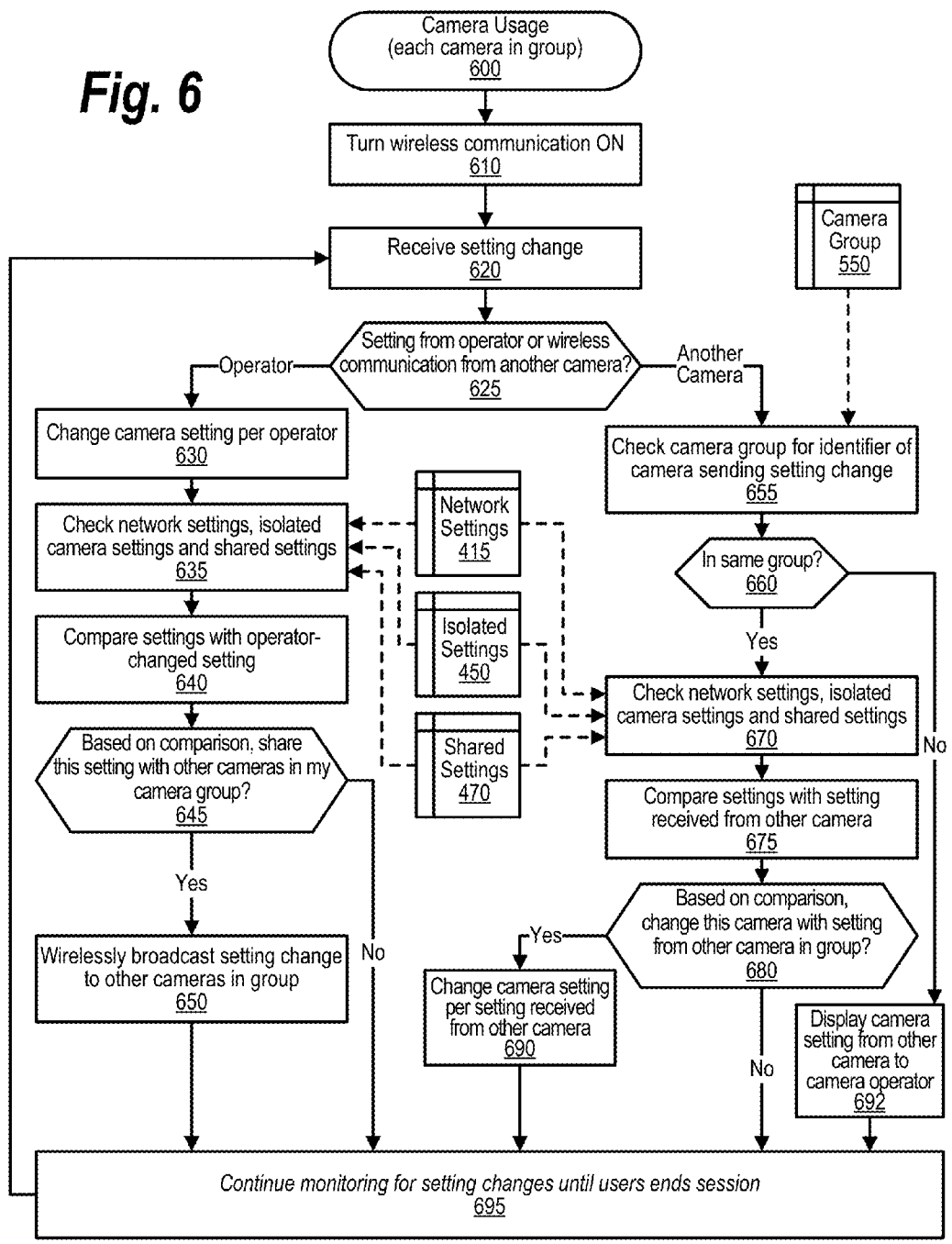
FIG. 6 is a flowchart that performs steps that control operational settings of the cameras included in the camera group.

FIG. 6 is a flowchart that performs steps that control operational settings of the cameras included in the camera group. FIG. 6 processing commences at 600 and shows the steps taken by a process that executes during camera usage, particularly when camera settings are changed. This routine is performed by each camera body that is included in the camera group.

At step 610, if the wireless transmitter/receiver of the camera body is turned OFF, then the process turns the wireless transmitter/receiver ON to receive setting change data from other camera bodies in the camera group and to transmit camera setting changes to other camera bodies in the camera group. At step 620, the process receives a setting change at the camera body. The setting change may have been a manual setting change performed by an operator (e.g., photographer, etc.) or it may have been a change performed at another camera body included in the camera group and wirelessly transmitted to this camera body. The process determines whether the received setting change was from an operator using this camera body or received in a wireless communication from another camera body (decision 625). If the received setting change was from an operator using this camera body, then decision 625 branches to the left ('operator') branch to perform steps 630 through 650. On the other hand, if the setting change was received in a wireless communication from another camera body, then decision 625 branches to the right ('another camera') branch to perform steps 655 through 692.

Steps 630 through 650 are performed when the setting change was received from an operator of this camera body. At step 630, the process changes the camera's setting based on the operator request or instruction. At step 635, the process retrieves the network settings from memory area 415, the isolated camera settings of this camera body from memory area 450, and the shared camera settings from memory area 470. At step 640, the process compares the settings retrieved at step 635 with the camera setting that was changed by the operator.

Based on the comparison performed at step 640, the process determines as to whether this camera setting provided by the operator should be shared with the other cameras in the camera group (decision 645). For example, regardless of the camera setting, if the network setting indicates that the camera group is configured to be a master/slave configuration and this camera body is designated as a "slave" camera in the group, then the setting would not be shared with other cameras in the group. However, if this camera is designated as the "master" in a master/slave configuration, or if a different configuration, such as a peer-to-peer configuration, is being utilized then the setting might be shared if the setting was configured to be a shared setting when the camera bodies were configured using the processing shown in FIG. 4. If, based on the comparison, the decision is to share this camera setting with other cameras in the camera group, then decision 645 branches to the 'yes' branch to perform step 650. On the other hand if, based on the comparison, the decision is to not share this camera setting with other cameras in the camera group, then decision 645 branches to the 'no' branch bypassing step 650. When a setting is shared then, at step 650, the process wirelessly broadcasts the setting change to the other camera bodies included in the camera group.

Returning to decision 625, steps 655 through 692 are performed when the setting change was received from another camera body. At step 655, the process checks the identifiers in the camera group for the identifier of the camera body that transmitted the setting change. The list of identifiers in the camera group are retrieved from memory area 550. Based on the check performed at step 655, the process determines whether the other camera and this camera are in the same camera group (decision 660). If the other camera and this camera are in the same camera group, then decision 660 branches to the 'yes' branch to perform steps 670 through 690. On the other hand, if the other camera and this camera are not in the same camera group, then decision 660 branches to the 'no' branch to perform optional step 692.

Steps 670 through 690 are performed when the cameras are in the same camera group. At step 670, the process retrieves the network settings from memory area 415, the isolated camera settings of this camera body from memory area 450, and the shared camera settings from memory area 470. At step 675, the process compares the settings retrieved at step 635 with the settings received from other camera.

Based on the comparison performed at step 675, the process determines whether to change this camera's settings with the setting change that was received from the other camera in the camera group (decision 680). For example, if this camera has a configuration setting making the changed setting an isolated setting, then this camera would not make the change received from the other camera. If based on the comparison, the decision is to change this camera with the setting from the other camera in the camera group, then decision 680 branches to the 'yes' branch to perform step 690. On the other hand, if the decision is to not change this camera with the setting from the other camera in the camera group, then decision 680 branches to the 'no' branch bypassing step 690.

When a setting received from another camera in the camera group is being used to change settings in this camera body then, at step 690, the process changes the camera setting in this camera body based on the setting change received from the other camera body in the camera group. In one embodiment, where the camera sending the camera setting is different from the camera being changed via step 690, an algorithm is utilized to adjust the received camera setting to a setting appropriate for this camera setting. For example, if the transmitting camera has a setting that is adjustable from one to twenty and the receiving camera has the same setting that is adjustable from one to ten, then a two-to-one based algorithm would be utilized by the receiving camera when processing the adjustment sent by the transmitting camera. For example, if an adjustment was made to the setting on the transmitting camera setting the value to "ten" (half of the possible amount) then, using the two-to-one ratio algorithm, the receiving camera would make the change and adjust the setting to "five."

Returning to decision 660, in one embodiment, if the cameras are not in the same camera group and decision 660 branches to the 'no' branch, then at step 692, the process displays the changed camera setting received from other camera on a display visible to this camera's operator. For example, in a photography class that is taking photographs of an event or subject, students of the class can see settings that are being used by other photographers, such as the instructor, without changing the student's camera's settings. In this way, the student can see in real-time how a more experienced photographer changes camera settings based on changes that occur in the environment.

After the received setting change has been processed as described above, at step 695, the process continues monitoring for setting changes from either the operator of this camera body or received over the camera body's wireless transmitter/receiver. When further setting changes are received, then processing loops back to step 620 to receive and process the next setting change as described above. This looping continues until the operator of the camera body ends the session, such as by turning off the camera.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    configuring a plurality of camera bodies, the configuring comprising establishing a camera group that includes each of the camera bodies, wherein each of the camera bodies in the camera group is controlled by a human operator in photographing an event;
    configuring one or more shared camera settings that pertain to each of the camera bodies in the camera group;

configuring one or more isolated camera settings that pertain to a first camera body in the camera group;

receiving, at the first camera body, a first adjustment to a first camera setting from the human operator;

wirelessly transmitting the first adjustment to other camera bodies included in the camera group in response to the first camera setting being one of the configured shared camera settings;

wirelessly receiving, at the first camera body, a second adjustment to a second camera setting from one of the other cameras in the camera group;

in response to determining that the second adjustment is not one of the isolated camera settings for the first camera body, adjusting the second camera setting for the first camera body, based on the received second adjustment; and in response to determining that the second adjustment is one of the isolated camera settings for the first camera body, inhibiting adjustment of the second camera setting for the first camera body.

2. The method of claim 1, wherein each of the camera bodies is physically handled by the human operator, and wherein the method further comprises:

receiving, at the first camera body, a third adjustment to a third camera setting from the human operator; and inhibiting transmitting the third adjustment to the other camera bodies included in the camera group in response to the third camera setting being one of the configured isolated camera settings.

3. The method of claim 1 wherein the establishing is performed prior to receiving the first adjustment to the first camera setting, and wherein the establishing further comprises:

turning on a wireless communications at the first camera body;

entering a camera group creation mode;

receiving, through the wireless communications, one or more identifiers corresponding to the other camera bodies that have wireless communications turned on and are in the camera group creation mode; and adding the one or more received identifiers to a memory of the first camera body.

4. The method of claim 3 wherein the establishing further comprises:

receiving, at the first camera body, a common token shared by the camera bodies included in the camera group;

selecting one or more of the identifiers received through the wireless communication, wherein the selected identifiers were included in transmissions that also included the common token;

adding the one or more selected identifiers to the camera group; and inhibiting adding any received identifiers to the camera group that were received in transmissions that failed to include the common token.

5. The method of claim 1 wherein the first camera body is designated as a "master" camera by the human operator and the other camera bodies included in the camera group are designated as "slave" cameras, wherein the "master" camera transmits one or more adjustments that are included in the shared camera settings to the "slave" cameras, and wherein the "slave" cameras inhibit transmission of adjustments to other camera bodies included in the camera group.

6. The method of claim 1 further comprising:

wirelessly receiving, at the first camera body, a fourth adjustment to a fourth camera setting from a camera body that is not included in the camera group;

inhibiting adjustment of the fourth camera setting for the first camera body, based on the fourth adjustment; and displaying the fourth adjustment on a display screen of the first camera body.

7. A computer program product stored in a computer readable storage medium, comprising computer program code that, when executed by an information handling system, performs actions comprising:

configuring a plurality of camera bodies, the configuring comprising establishing a camera group that includes each of the camera bodies, wherein each of the camera bodies in the camera group is controlled by a human operator in photographing an event;

configuring one or more shared camera settings that pertain to each of the camera bodies in the camera group;

configuring one or more isolated camera settings that pertain to a first camera body in the camera group;

receiving, at the first camera body, a first adjustment to a first camera setting from the human operator;

wirelessly transmitting the first adjustment to other camera bodies included in the camera group in response to the first camera setting being one of the configured shared camera settings;

wirelessly receiving, at the first camera body, a second adjustment to a second camera setting from one of the other cameras in the camera group;

in response to determining that the second adjustment is not one of the isolated camera settings for the first camera body, adjusting the second camera setting for the first camera body, based on the received second adjustment; and in response to determining that the second adjustment is one of the isolated camera settings for the first camera body, inhibiting adjustment of the second camera setting for the first camera body.

8. The computer program product of claim 7, wherein each of the camera bodies is physically handled by the human operator, and wherein the actions further comprise:

receiving, at the first camera body, a third adjustment to a third camera setting from the human operator; and inhibiting transmitting the third adjustment to the other camera bodies included in the camera group in response to the third camera setting being one of the configured isolated camera settings.

9. The computer program product of claim 7 wherein the establishing is performed prior to receiving the adjustment to the first camera setting, and wherein the establishing further comprises:

turning on a wireless communications at the first camera body;

entering a camera group creation mode;

receiving, through the wireless communications, one or more identifiers corresponding to the other camera bodies that have wireless communications turned on and are in the camera group creation mode; and adding the one or more received identifiers to a memory of the first camera body.

10. The computer program product of claim 9 wherein the establishing further comprises:

receiving, at the first camera body, a common token shared by the camera bodies included in the camera group;

selecting one or more of the identifiers received through the wireless communication, wherein the selected identifiers were included in transmissions that also included the common token;

adding the one or more selected identifiers to the camera group; and inhibiting adding any received identifiers to the camera group that were received in transmissions that failed to include the common token.

11. The computer program product of claim 7 wherein the first camera body is designated as a "master" camera by the human operator and the other camera bodies included in the camera group are designated as "slave" cameras, wherein the "master" camera transmits one or more adjustments that are included in the shared camera settings to the "slave" cameras, and wherein the "slave" cameras inhibit transmission of adjustments to other camera bodies included in the camera group.

12. The computer program product of claim 7 wherein the actions further comprise:

wirelessly receiving, at the first camera body, a fourth adjustment to a fourth camera setting from a camera body that is not included in the camera group;

inhibiting adjustment of the fourth camera setting for the first camera body, based on the fourth adjustment; and displaying the fourth adjustment on a display screen of the first camera body.

* * * * *